US008881123B2

(12) United States Patent
Chang et al.

(10) Patent No.: US 8,881,123 B2
(45) Date of Patent: Nov. 4, 2014

(54) ENABLING SYMBOL RESOLUTION OF PRIVATE SYMBOLS IN LEGACY PROGRAMS AND OPTIMIZING ACCESS TO THE PRIVATE SYMBOLS

(71) Applicant: Oracle International Corporation, Redwood Shores, CA (US)

(72) Inventors: Mason Chang, Arcadia, CA (US); Hassan Chafi, San Mateo, CA (US); Eric Sedlar, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 142 days.

(21) Appl. No.: 13/690,513

(22) Filed: Nov. 30, 2012

(65) Prior Publication Data

US 2014/0157247 A1    Jun. 5, 2014

(51) Int. Cl.
*G06F 9/44*    (2006.01)
*G06F 9/45*    (2006.01)

(52) U.S. Cl.
USPC ........... 717/146; 717/100; 717/114; 717/115; 717/132; 717/140; 717/141; 717/144; 717/152

(58) Field of Classification Search
CPC ........... G06F 8/53; G06F 8/427; G06F 8/433; G06F 8/443; G06F 8/447; G06F 17/2247; G06F 12/023; G06T 1/60; G06T 12/023
See application file for complete search history.

(56) References Cited

U.S. PATENT DOCUMENTS 5,590,329 A * 12/1996 Goodnow et al. ............. 717/144
5,907,709 A *  5/1999 Cantey et al. ................. 717/141
6,151,703 A * 11/2000 Crelier .......................... 717/136
6,259,958 B1 * 7/2001 Steinman et al. ............. 717/100
6,327,704 B1   12/2001 Mattson et al.
6,427,234 B1    7/2002 Chambers et al.

(Continued)

FOREIGN PATENT DOCUMENTS

EP    1618474 B1    3/2004

OTHER PUBLICATIONS

Jeff Arnold et al., "Ksplice: Automatic Rebootless Kernel Updates", Massachusetts Institute of Technology ACM, 12 pgs. , 2009.

(Continued)

*Primary Examiner* — Don Wong
*Assistant Examiner* — Anibal Rivera
(74) *Attorney, Agent, or Firm* — Hickman Palermo Truong Becker Bingham Wong LLP

(57) ABSTRACT

A method for generating a binary executable of a program so that private symbols in a module are accessible from another module. In one embodiment, the method compiles a source program to an intermediate representation and scans the representation to find the private symbols in the program's modules. It then wraps a function around each private symbol. When called, the function returns an address of the private symbol, so that the other module can access the symbol from outside the module in which the symbol is found. At run time, a call is made to obtain the address of the function, which is then executed to obtain the address of the private symbol so that the symbol can be accessed. In another embodiment, a Just-In-Time compiler executes the wrapper functions and patches the executable program with the direct address of the private symbol to avoid a call to the wrapper function.

22 Claims, 8 Drawing Sheets

(56) References Cited

U.S. PATENT DOCUMENTS

| | | | |
|---|---|---|---|
| 7,200,837 B2* | 4/2007 | Stevens | 717/114 |
| 7,689,979 B1* | 3/2010 | Sawyer et al. | 717/152 |
| 7,996,826 B2 | 8/2011 | Park et al. | |
| 8,136,103 B2 | 3/2012 | Cascaval et al. | |
| 2006/0048114 A1 | 3/2006 | Schmidt | |
| 2006/0090157 A1 | 4/2006 | Park et al. | |
| 2006/0130021 A1* | 6/2006 | Plum et al. | 717/140 |
| 2007/0157166 A1* | 7/2007 | Stevens | 717/114 |
| 2007/0168949 A1* | 7/2007 | Shattuck et al. | 717/115 |
| 2009/0064113 A1 | 3/2009 | Langman et al. | |
| 2009/0249316 A1 | 10/2009 | Cascaval et al. | |
| 2009/0282393 A1* | 11/2009 | Costa et al. | 717/132 |
| 2011/0246974 A1 | 10/2011 | Kawachiya et al. | |
| 2014/0082597 A1 | 3/2014 | Chafi et al. | |

OTHER PUBLICATIONS

Gautam Altekar et al., "OPUS: Online Patches and Updates for Security", USENIX Security '05, 18 pgs.

U.S. Appl. No. 13/620,124, filed Sep. 14, 2012, Office Action. Apr. 22, 2014.

* cited by examiner

300

```
//File A.c
1. static int var;

// File A.h
...
1. void* getVar() {
2.   return &var;
3. }

// File B.c
1. void bar() {
2.   void* var = getVar();
3.   *var = 4;
4. }
```

FIG. 3

```
1. static int global_variable;
2. void foo() {
3.     global_variable = 5;
4. }
```

FIG. 6A

```
1. void* global_variable_STATIC_WRAPPER() {
2.     return &global_variable;
3. }
```

FIG. 6B

```
1. void foo_JIT_COMPILED_VERSION() {
2.     void* global_variable_address = global_variable_STATIC_WRAPPER();
3.     *global_variable_address = 5;
4. }
```

FIG. 6C

```
1. static int global_variable;
2. void foo_JIT_COMPILED_OPTIMIZED_VERSION() {
3.    *global_variable_address = 5;
4. }
```

FIG. 6D

```
1. static int global_variable;
2. void foo() {
3. jump foo_JIT_COMPILED_OPTIMIZED_VERSION
   ...
4. *global_variable_address = 5;
5. }
```

FIG. 6E

```
1. void foo_JIT_COMPILED_OPTIMIZED_VERSION() {
2. *global_variable_address = 5;
3. }
```

FIG. 6F

ENABLING SYMBOL RESOLUTION OF PRIVATE SYMBOLS IN LEGACY PROGRAMS AND OPTIMIZING ACCESS TO THE PRIVATE SYMBOLS

BACKGROUND

Presently, there exists a large body of legacy code written in C or C++. Often, it is desirable to extend the functionality of this code by writing new applications, which become new modules in C or C++. Such applications include online hot patching and a Just-In-Time compiler. Writing these new applications depends on accessing symbols contained in the legacy code, but often the needed symbols are unavailable. If so, the new applications cannot be dynamically linked in, rendering them inoperable.

Static linkers do not encounter this problem because in the intermediate steps between compiling a program and generating a resulting binary, all symbol information is included in an object file such that the static linker can resolve all of the symbols.

Dynamic linkers do not encounter this problem if all of the symbols are exported and no private symbols are used in the modules. Private symbols occur if a symbol in a C program is annotated with the 'static' keyword, which forces the symbol to be private in the current C module. Thus, private symbols cannot be resolved with dlsym( ) call at runtime and a new module cannot be linked in with the current running binary if the new module makes references to private symbols in the original binary.

Attempts have been made to solve the private symbol problem, but none has proven satisfactory.

One attempt is to remove all 'static' references, but doing so is not practical with large code bases, which may frequently use the 'static' keyword.

Another attempt is to manually inspect and resolve all 'static' symbols that are used by the new module and explicitly export those symbols. The Linux Kernel has an explicit EXPORT_SYMBOL macro, which does this on a per module basis. However, manual inspection is very error prone. Whenever a new module requires a new reference to an existing private symbol, the author must also modify the original program.

Yet another attempt includes writing a C parser that parses the original C program to resolve and export private symbols. However, writing a C parser is very difficult to get right due to the C macro system. In addition, the author may not have access to all of the modules in the original C program, some of which define the symbols needed by the author. In this case, the author must manually write a wrapper function to export the private symbol.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

One embodiment is a method for generating an executable binary of a program in which private symbols are externally accessible. The method includes: generating an intermediate representation (IR) of the program by compiling the program, where the program contains at least one module that includes one or more private symbols, and each private symbol is accessible only within the one module; discovering the private symbols in the program by scanning the IR; generating a wrapper function for each of the discovered functions, such that calling the wrapper function provides access to the private symbol from another module; combining the program with the wrapper functions to create a combined program; and generating the executable binary by recompiling the combined program, so that the other module in the executable binary has access to each of the private symbols of the one module by calling the wrapper function for the symbol.

The embodiment enables legacy binaries to be modified and enhanced with dynamic linking. Previously, this was difficult because whole programs would need to be rewritten to remove 'static' and 'extern' functions and possibly redesigned such that symbols could properly be resolved via a dlsym( ) call. This is a risky and error prone operation. The embodiment cleanly enables such functionality by exposing only the previously private symbols, enabling dynamic linking.

The embodiment enhances business functions and only slightly decreases performance. Because private symbols are exposed, dynamic linking works as intended with a standard dlsym( ) function. Both online hot patching and the dynamic addition of modules are made possible.

One such use of linking in modules is the hot patching functionality in legacy code in a running application. This enables a module to be overwritten with an updated patched module without shutting down the application, increasing reliability and availability. The added level of indirection slightly decreases performance, but the penalty only occurs when a private symbol needs to be resolved, which is already a computationally expensive operation.

While hot patching is one application, the embodiment is applicable to any C program that requires dynamic linking to enhance functionality at runtime. Many legacy C systems use dynamic linking and are restricted in their use due to the limited export of symbols in legacy code.

Another embodiment includes: generating an intermediate representation (IR) of the program by compiling the program, where the program contains at least one module that includes one or more private symbols, where the IR contains a wrapper function for each private symbol, and where the wrapper function, when called, provides an address for each private symbol so that a function in another module has access to the private symbol via the address; and generating the executable binary by recompiling the program, wherein recompiling includes, for each private symbol: identifying a pointer to the wrapper function by scanning the IR; obtaining a direct address of the private symbol by using the pointer to the wrapper function to execute the wrapper function; creating an optimized function that contains the direct address for the private symbol; and patching the function in the other module so that the function executes the optimized function to access the private symbol.

This embodiment eliminates the runtime overhead of calling a static wrapper function, by using Just-In-Time (JIT) compilation. Instead of leaving the static wrapper function in the finally compiled code, the JIT compilation replaces, during runtime, the static wrapper function with an optimized function that has the address of the private symbol in the finally compiled code.

DRAWINGS

In the drawings:

FIG. 3 depicts example code for implementing a wrapper;

Figure 5:
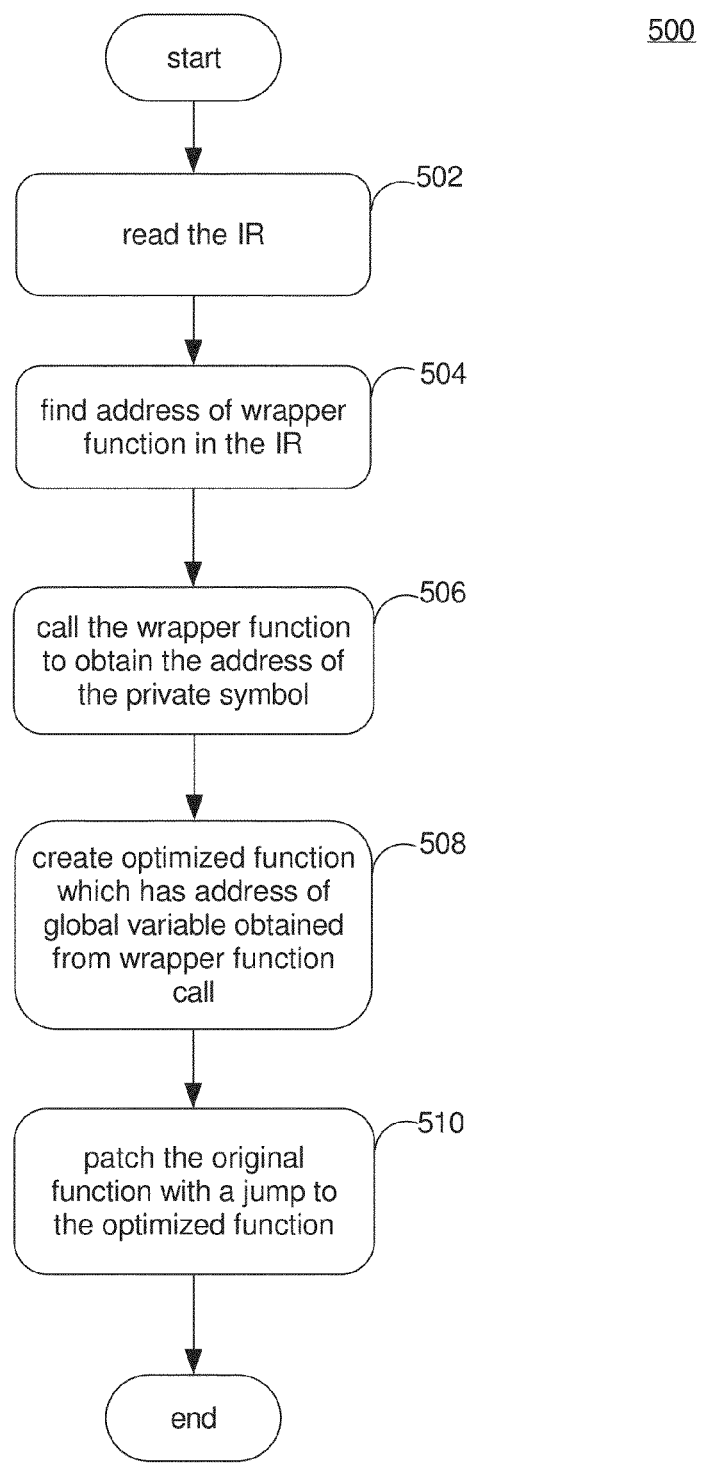
FIG. 5 depicts a flow chart for the other embodiment.

FIGS. 6A-F depict pseudo-code for the steps in the flow chart of FIG. 5; and

Figure 7:
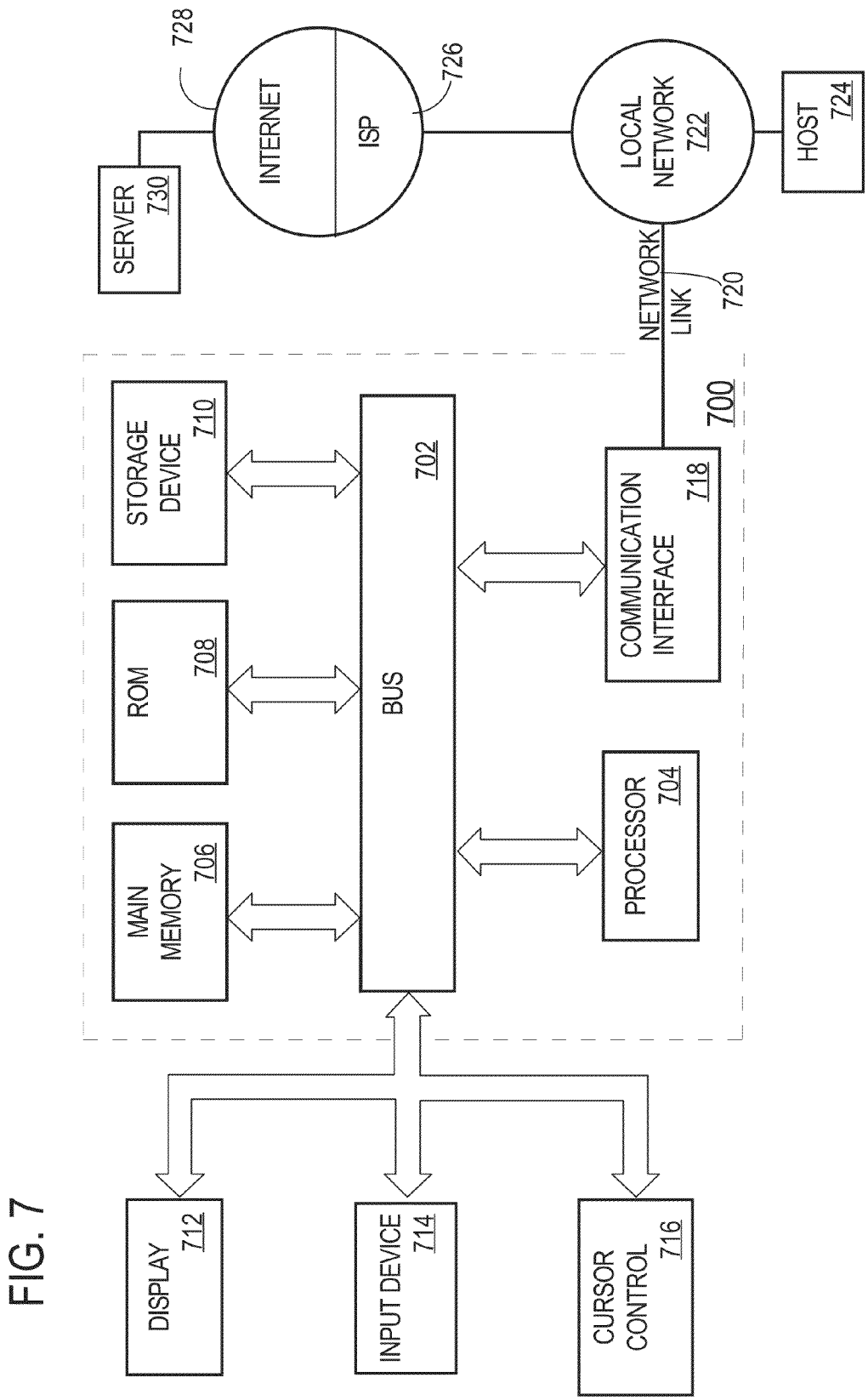

FIG. 7 depicts an example system setting in which an embodiment can operate.

DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Linkers and Compilers export symbols so that symbolic names for variables and functions can be resolved at link time. However, there are private symbols, such as static functions and static variables, whose visibility is limited to the current module. This limited visibility is a problem during dynamic linking because unresolved symbols prevent program execution.

An embodiment exposes these private symbols through automatic generation of wrapper functions that are included in a C source file. To aid in the generation of the wrapper functions that indirectly access the private symbols and perform optimizations, the embodiment generates an intermediate representation (IR) of the source code. An intermediate representation is any representation that is used by a compiler after the source code is parsed and before machine code is generated. Java bytecode and LLVM IR are examples of intermediate representations, though it not necessary that the IR be written in the language that a virtual machine executes. An IR is useful because it makes it easier for the compiler to perform analysis, transformations, and optimizations of the source file. Because the embodiment has access to precise symbol information via the IR, the embodiment generates wrapper functions only for those symbols that are actually private in the original binary instead of duplicating all existing symbols.

The embodiment allows a dynamic linker to accurately resolve private symbols without drastically modifying the original C source code, enabling new modules and functionality to be dynamically linked at runtime.

Another embodiment calls the wrapper functions during compilation to obtain the address of the symbol and then patches the symbol address into the finally compiled code, thereby eliminating a call to the wrapper during code execution.

DETAILED DESCRIPTION

Figure 1:
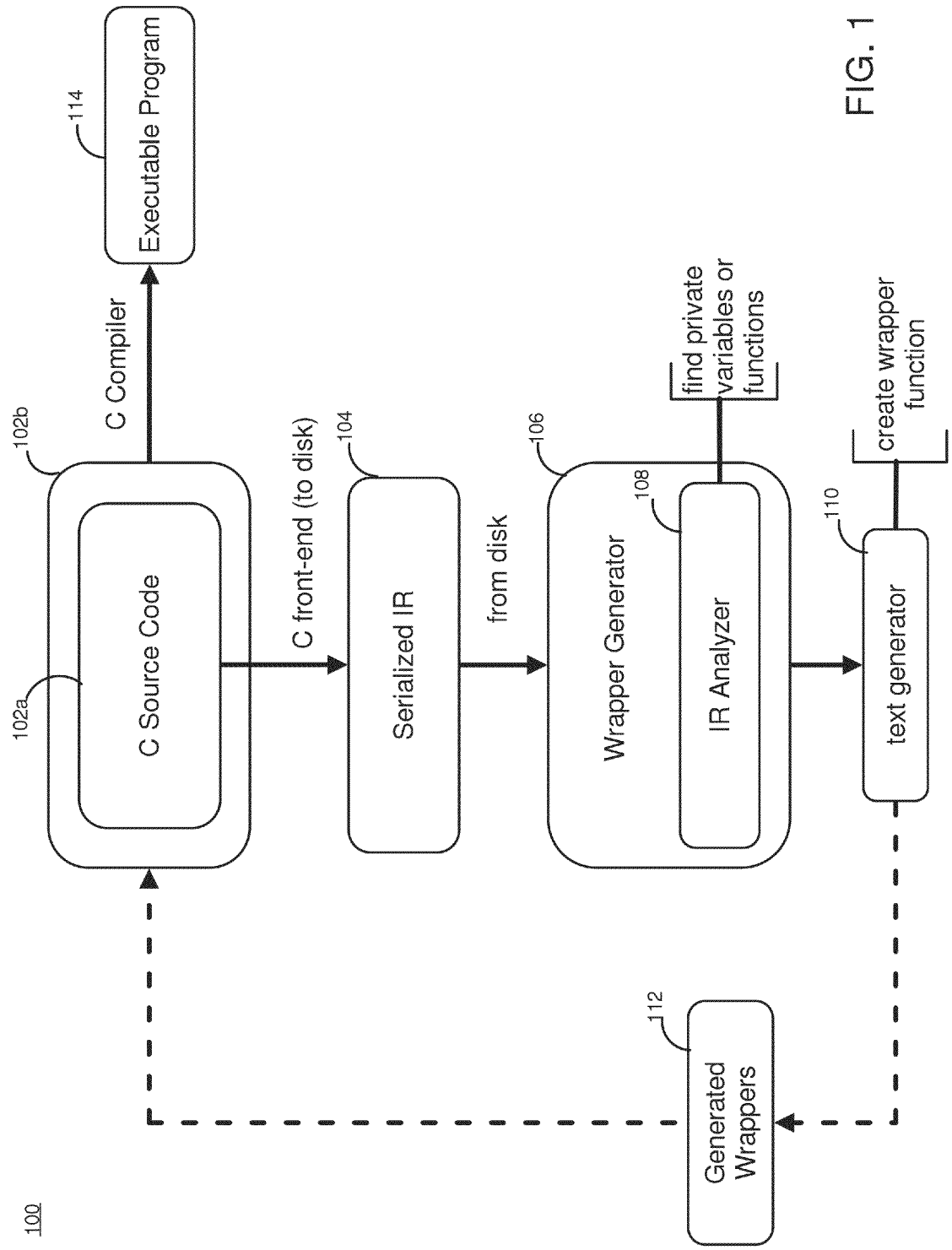
FIG. 1 depicts an example system architecture.

FIG. 1 depicts an example system architecture 100 in one embodiment. The system includes a C compiler 102 that includes a front-end compiler 102a, a source code compiler 102b, and a wrapper generator 106 that includes an IR analyzer 108, and a text generator 110.

The C front-end compiler 102a parses the C source code, resolves known symbols, and generates a compiler intermediate representation (IR) 104 of the source code. In the embodiment, instead of creating an object file, the IR is saved in persistent storage for use in a later step. The saved IR 104 contains all the symbols used in the C module and denotes the linkage type for all symbols.

The IR analyzer 108 reads the stored IR 104 to find private symbols, which are located where static declarations of variables and functions are used.

The text generator 110 generates and saves in persistent storage the wrapper functions, which are valid C functions. These newly generated wrapper functions 112 are fed back to the C compiler 102, so that it can generate the executable program 114.

The C compiler 102b re-compiles the original C program and a header file, containing the generated wrapper functions 112 into a binary executable 114. The executable 114 now contains the automatically generated wrapper functions 112, which now expose the previously private symbols, making them public symbols.

Figure 2:
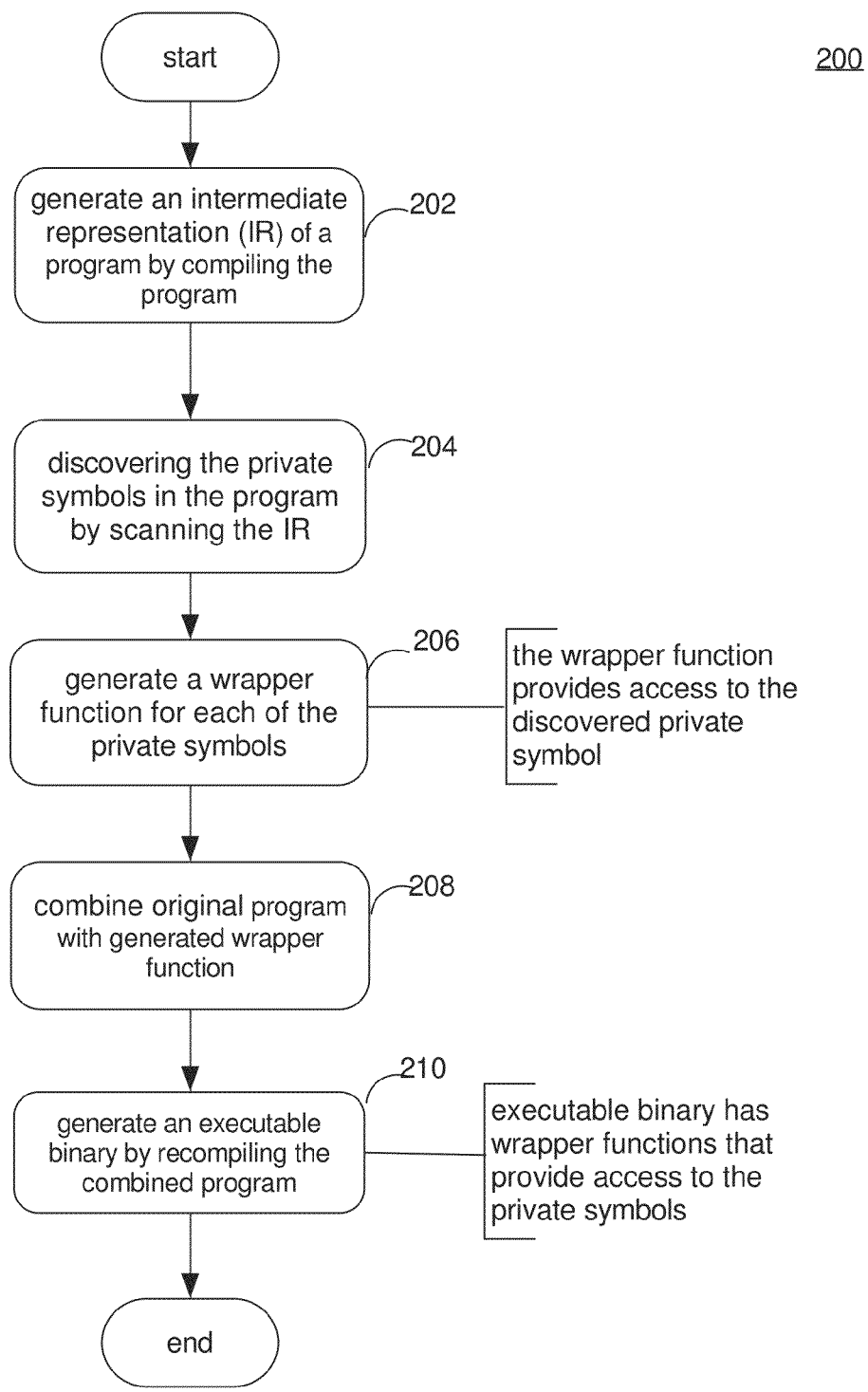
FIG. 2 depicts a flow chart for an embodiment.

FIG. 2 depicts a flow chart 200 for an embodiment. In step 202, a C program is compiled by a C front-end compiler that outputs and saves an intermediate representation (IR) of the source code. In step 204, the IR analyzer scans the stored IR to discover symbols or functions declared to be static or private. Because the analyzer uses the IR instead of object code or source code, the analyzer is able to determine the particular symbols that are private to the current module. In step 206, the text generator writes a wrapper function for each private symbol to make them externally accessible. In step 208, the original C program is combined with the generated wrapper functions. In step 210, the C compiler re-compiles the combined source code to create a binary executable, which now has all public symbols unmodified, all private symbols still private, and public wrapper functions that access the private symbols.

In operation, when a new module is linked in, the dynamic linker makes a standard dlsym( ) call to obtain the address (i.e., the pointer) of the wrapper function for a private symbol. The wrapper function is executed by calling the function via the pointer, which then returns the address of the private symbol. Thus, through one level of indirection, a previously private symbol is made accessible outside the module in which it was declared static or private.

FIG. 3 depicts example pseudo-code for implementing and using a wrapper function. In line 1 of file A.c, a variable var is declared to be a static integer, which means that the integer variable has a scope that is limited to the current file, A.c, such that only code in file A.c can access the variable. The wrapper generator generates creates a header file, A.h, and includes the wrapper function, getVar( ), which returns the address of (&var) of the private variable in file A.c. Wrapper function getVar( ) is declared to return a void pointer, because the private variable can be of any type. In lines 1-2 of B.c, a different module, the function bar( ) includes a call to the wrapper function getVar( ), which returns the address of the variable var. The code in line 3 of B.c is thus able to modify variable (e.g., by an assignment) because it has access to a pointer to the variable.

In another embodiment, as mentioned above, a compiler executes each wrapper function to obtain the address of the private symbol and a code patcher patches the code to instead use an optimized function containing the address of the private symbol. This avoids the overhead of calling the function wrapper during execution of the code.

Figure 4:
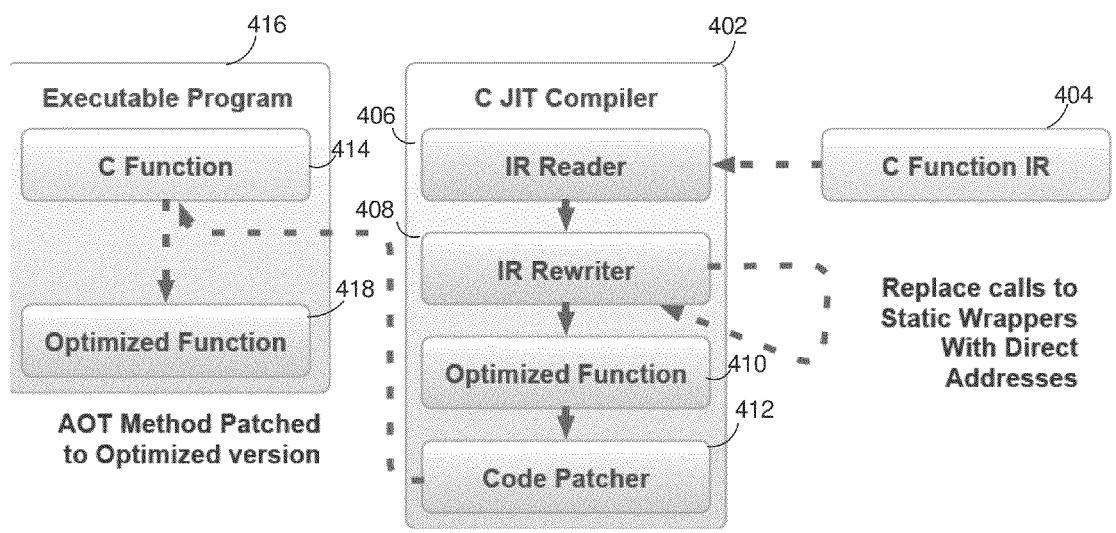
FIG. 4 depicts an example system architecture for another embodiment.

FIG. 4 depicts an example system architecture in another embodiment. The system includes a C Just-In-Time (C-JIT) compiler 402 and a C Function Intermediate Representation (IR) 404. The C-JIT compiler 402 includes an IR reader 406, an IR rewriter 408, an optimized function module 410, and a code patcher 412. The IR Rewriter 408 is coupled to the IR Reader 406 to receive the IR 404. The optimized function module 410 obtains the output of the IR Rewriter 408, forms an optimized function (described below), and provides the optimized function as input to the code patcher 412, which patches the original function 414 in the executable program 416 to call the optimized function 418.

FIG. 5 depicts a flow chart in accordance with the embodiment in FIG. 4, and FIGS. 6A-6F depict pseudo-code for various steps. In step 502, the IR reader 406 of the JIT compiler reads the IR 404 and supplies the IR 404 to the IR rewriter 408. The IR 404 has already been created by a C compiler front end, which stores the IR in persistent storage with a wrapper function for each private symbol, as explained above.

FIGS. 6A-6C depict pseudo-code that illustrates the stored IR with the wrapper function modification of the original function containing a private symbol. FIG. 6A depicts an original function that has a variable declared static. FIG. 6B depicts a wrapper function for the original function. As described above, the wrapper function contains a function which when called returns the address of the static variable. FIG. 6C depicts the modified original function, which when called, calls the wrapper function to obtain the address of the static variable so that the variable can be modified.

In step 504, during JIT compile time, the IR rewriter 408 scans the IR to identify the instructions that call each wrapper function. The output of the IR rewriter is fed to the JIT compiler which compiles the function to a form shown in FIG. 6C.

In step 506, the optimized function module 410 obtains the address of the function's private symbol by calling, during JIT compile time, the wrapper function, depicted in FIG. 6B.

In step 508, the optimized function module 410 creates an optimized function that contains the address of the private symbol obtained in step 506. The IR rewriter replaces the call instructions discovered in step 504 with the private symbol addresses discovered in step 506. FIG. 6D depicts the optimized version of the original function.

In step 510, the code patcher patches the original function to jump to the optimized function. In this manner, when the binary program is executed, no performance penalty is incurred because the wrapper functions have been replaced with optimized functions that have direct access to the static symbol. FIG. 6E depicts the patch to the original function. In the patched original function, the patcher places a jump to the optimized function, which is depicted in FIG. 6F.

The pseudo-code in FIGS. 6A-6F is now described in more detail. Line 1 in FIG. 6A declares variable global_variable to be a static integer. Line 2 in FIG. 6A declares foo to be a function that has no return value. Line 3 in FIG. 6A assigns a value to global_variable, and line 4 closes the function body.

In FIG. 6B, line 1, a wrapper function, global_variable_STATIC_WRAPPER( ), is declared to be a function that returns a void pointer. Line 2 is a return statement that returns the address of global_variable. Line 3 closes the function body.

In FIG. 6C, line 1, the function foo_JIT_COMPILED_VERSION( ), is declared to return nothing. Line 2 in the function body calls the wrapper function, global_variable_STATIC_WRAPPER( ), which returns the address of global_variable, which is then assigned to the variable global_variable_address, which is declared to be a void pointer, global_variable_address being the address of the private symbol. In line 3, the global_variable_address is dereferenced to assign a value to the variable.

In FIG. 6D, line 1, global_variable is declared to have type static integer. In line 3, the variable is used in foo_JIT_COMPILED_OPTIMIZED_VERSION( ), which is declared in line 2 to have no return value and which assigns a value to global_variable.

In FIG. 6E, line 1, global_variable is declared to have type static integer. In line 2, the original function is declared to have no return value. In line 3, an instruction is written into the body of the original function to jump to the optimized function, foo_JIT_COMPILED_OPTIMIZED_VERSION. Line 4 is not executed because of the jump.

In FIG. 6F, line 1 declares foo_JIT_COMPILED_OPTIMIZED_VERSION( ) to return nothing and in line 2, the function assigns a value to global_variable.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 404 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 620 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 622 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating an executable binary of a program in which private symbols are externally accessible, the method comprising:

generating an intermediate representation (IR) of the program by compiling the program, wherein the program contains at least one module that includes one or more private symbols, and wherein each private symbol of the one or more private symbols is accessible only within the at least one module;

discovering the one or more private symbols in the program by scanning the IR;

generating a respective wrapper function for each private symbol of the one or more private symbols, such that calling the respective wrapper function provides access to said each private symbol from another module;

combining the program with each respective wrapper function of the one or more private symbols to create a combined program; and generating the executable binary by recompiling the combined program, so that the another module in the executable binary has access to each private symbol of the one or more private symbols of the at least one module by calling the respective wrapper function for said each private symbol.

2. The method of claim 1, wherein the program is a C program.

3. The method of claim 1, wherein the program is a C++ program.

4. The method of claim 1,
wherein calling the wrapper function returns a pointer to the private symbol; and
wherein dereferencing the pointer gives access to a value of the private symbol.

5. The method of claim 1, wherein at least one of the one or more private symbols is declared "static."

6. A non-transitory computer-readable medium containing one or more sequences of instructions for generating an executable binary of a program in which private symbols are externally accessible, wherein execution of the one or more sequences of instructions by one or more processors causes:
generating an intermediate representation (IR) of the program by compiling the program, wherein the program contains at least one module that includes one or more private symbols, and
wherein each private symbol of the one or more private symbols is accessible only within the at least one module;
discovering the one or more private symbols in the program by scanning the IR;
generating a respective wrapper function for each private symbol of the one or more private symbols, such that calling the respective wrapper function provides access to said each private symbol from another module;
combining the program with each respective wrapper function of the one or more private symbols to create a combined program; and
generating the executable binary by recompiling the combined program, so that the another module in the executable binary has access to each private symbol of the one or more private symbols of the at least one module by calling the respective wrapper function for said each private symbol.

7. The non-transitory computer-readable medium of claim 6, wherein the program is a C program.

8. The non-transitory computer-readable medium of claim 6, wherein the program is a C++ program.

9. The non-transitory computer-readable medium of claim 6,
wherein calling the wrapper function returns a pointer to the private symbol; and
wherein dereferencing the pointer gives access to a value of the private symbol.

10. The non-transitory computer-readable medium of claim 6, wherein at least one of the one or more private symbols is declared "static."

11. A method for generating an executable binary of a program in which private symbols are externally accessible, the method comprising:
generating an intermediate representation (IR) of the program by compiling the program, wherein the program contains at least one module that includes one or more private symbols,
wherein the IR contains a respective wrapper function for each private symbol of said one or more private symbols, and
wherein the respective wrapper function for each private symbol of said one or more private symbols, when called, provides a direct address for said each private symbol so that a function in another module has access to said private symbol via the direct address for said each private symbol; and
generating the executable binary by recompiling the program, wherein recompiling includes, for each private symbol of said one or more private symbols:
identifying a pointer to the respective wrapper function of said each private symbol by scanning the IR;
obtaining a direct address of said each private symbol by using the pointer to the Respective wrapper function to execute the wrapper function;
creating a respective optimized function that contains the direct address for the said each private symbol; and
patching the function in the another module so that the function executes the respective optimized function to access said each private symbol.

12. The method of claim 11, wherein the program is a C program.

13. The method of claim 11, wherein the program is a C++ program.

14. The method of claim 11, wherein for each private symbol of said one or more private symbols, said function in another module dereferences a pointer set to the direct address for said each private symbol.

15. The method of claim 11, wherein at least one of the private symbols is declared "static."

16. The method of claim 11, wherein patching the function includes placing in the function a jump to the respective optimized function.

17. A non-transitory computer-readable medium containing one or more sequences of instructions for generating an executable binary of a program in which private symbols are externally accessible, wherein execution of the one or more sequences of instructions by one or more processors causes:
generating an intermediate representation (IR) of the program by compiling the program, wherein the program contains at least one module that includes one or more private symbols,
wherein the IR contains a respective wrapper function for each private symbol of said one or more private symbols, and
wherein the respective wrapper function for each private symbol of said one or more private symbols, when called, provides a direct address for said each private symbol so that a function in another module has access to said private symbol via the direct address for said each private symbol; and
generating the executable binary by recompiling the program, wherein recompiling includes, for each private symbol of said one or more private symbols:
identifying a pointer to the respective wrapper function of said each private symbol by scanning the IR;
obtaining a direct address of said each private symbol by using the pointer to the respective wrapper function to execute the wrapper function;
creating a respective optimized function that contains the direct address for said each private symbol; and
patching the function in the another module so that the function executes the respective optimized function to access said each private symbol.

18. The non-transitory computer-readable medium of claim 17, wherein the program is a C program.

19. The non-transitory computer-readable medium of claim 17, wherein the program is a C++ program.

20. The non-transitory computer-readable medium of claim 17, wherein for each private symbol of said one or more private symbols, said function in another module dereferences a pointer set to the direct address for said each private symbol.

21. The non-transitory computer-readable medium of claim 17, wherein at least one of the private symbols is declared "static."

22. The method of claim 17, wherein patching the function includes placing in the function a jump to the respective optimized function.

* * * * *

UNITED STATES PATENT AND TRADEMARK OFFICE
CERTIFICATE OF CORRECTION

| | | |
|---|---|---|
| PATENT NO. | : 8,881,123 B2 | |
| APPLICATION NO. | : 13/690513 | |
| DATED | : November 4, 2014 | |
| INVENTOR(S) | : Chang et al. | |

It is certified that error appears in the above-identified patent and that said Letters Patent is hereby corrected as shown below:

In the Claims

In column 10, line 7, in Claim 11, delete "Respective" and insert -- respective --, therefor.

In column 10, line 10, in Claim 11, after "for" delete "the".

In column 11, line 8, in Claim 22, delete "method" and insert -- "non-transitory computer-readable medium" --, therefor.

Signed and Sealed this
Fourteenth Day of July, 2015

Michelle K. Lee
*Director of the United States Patent and Trademark Office*